(12) United States Patent
Seo

(10) Patent No.: US 10,126,046 B2
(45) Date of Patent: Nov. 13, 2018

(54) REFRIGERATOR AND METHOD FOR CONTROLLING THE SAME

(71) Applicant: LG ELECTRONICS INC., Seoul (KR)

(72) Inventor: Sangwook Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 14/924,865

(22) Filed: Oct. 28, 2015

(65) Prior Publication Data

US 2016/0195330 A1    Jul. 7, 2016

(30) Foreign Application Priority Data

Jan. 5, 2015 (KR) .................. 10-2015-0000696

(51) Int. Cl.
| F25D 29/00 | (2006.01) |
|---|---|
| F25B 49/02 | (2006.01) |
| F25D 11/00 | (2006.01) |
| G05B 15/02 | (2006.01) |
| F25D 17/06 | (2006.01) |

(52) U.S. Cl.
CPC ............ *F25D 29/00* (2013.01); *F25B 49/022* (2013.01); *F25D 11/00* (2013.01); *F25D 17/065* (2013.01); *G05B 15/02* (2013.01); *F25B 2400/01* (2013.01); *F25B 2600/0251* (2013.01); *F25D 2600/00* (2013.01)

(58) Field of Classification Search
CPC ............ F25B 2600/0251; F25B 49/022; F25D 11/00; F25D 2600/00; F25D 29/00; G05B 15/02

USPC ............................................ 62/630
See application file for complete search history.

(56) References Cited

U.S. PATENT DOCUMENTS

| 3,675,437 A * | 7/1972 | Linstromberg | F25C 1/24 62/137 |
|---|---|---|---|
| 4,071,745 A | 1/1978 | Hall | |
| 4,653,285 A * | 3/1987 | Pohl | F25D 21/006 318/729 |

(Continued)

FOREIGN PATENT DOCUMENTS

| CN | 101676639 | 3/2010 |
|---|---|---|
| CN | 102338545 | 2/2012 |

(Continued)

OTHER PUBLICATIONS

Korean Office Action dated Oct. 31, 2016 issued in Application No. 10-2015-0000696.

(Continued)

*Primary Examiner* — Henry Crenshaw
(74) *Attorney, Agent, or Firm* — KED & Associates LLP

(57) ABSTRACT

Provided are a refrigerator and a method for controlling the same. The method for controlling the refrigerator according to the embodiment of the present disclosure includes turning on the refrigerator, and starting a compressor; setting a predetermined power-consuming factor to a basic value; measuring a power consumption within a setting period, while the refrigerator is operated; recognizing whether the measured power consumption is smaller than a previous power consumption; and changing a value of the power-consuming factor, when the measured power consumption is greater than the previous power consumption.

10 Claims, 5 Drawing Sheets

(56) References Cited

U.S. PATENT DOCUMENTS

| | | | |
|---|---|---|---|
| 4,870,833 A * | 10/1989 | Matsuda | B60H 1/00428 62/134 |
| 5,560,422 A | 10/1996 | Matumoto | |
| 6,053,002 A | 4/2000 | Matsumoto | |
| 6,216,478 B1 | 4/2001 | Kang | |
| 6,478,084 B1 | 11/2002 | Kumar | |
| 6,487,869 B1 | 12/2002 | Sulc | |
| 7,228,694 B2 | 6/2007 | Schwarz et al. | |
| 8,378,835 B2 | 2/2013 | Shin et al. | |
| 9,140,478 B2 | 9/2015 | Gomes et al. | |
| 9,534,821 B2 | 1/2017 | Yoon | |
| 2004/0237551 A1 * | 12/2004 | Schwarz | F25B 49/025 62/229 |
| 2004/0244395 A1 * | 12/2004 | Kim | F24F 1/46 62/228.1 |
| 2005/0022543 A1 * | 2/2005 | Shim | F25D 17/045 62/186 |
| 2005/0039469 A1 * | 2/2005 | Nonaka | F25B 49/005 62/129 |
| 2005/0086952 A1 * | 4/2005 | Nonaka | F25B 49/005 62/129 |
| 2005/0183434 A1 | 8/2005 | Iritani | |
| 2008/0014852 A1 * | 1/2008 | Mielke | B60H 1/00428 454/75 |
| 2008/0190125 A1 * | 8/2008 | Yoshioka | F25B 1/10 62/208 |
| 2009/0235677 A1 | 9/2009 | Yanagida | |
| 2010/0064708 A1 | 3/2010 | Seki | |
| 2010/0179693 A1 | 7/2010 | Sung | |
| 2010/0293977 A1 | 11/2010 | Tanaka | |
| 2011/0175742 A1 | 7/2011 | Shin | |
| 2011/0197607 A1 | 8/2011 | Tanaka et al. | |
| 2012/0023980 A1 | 2/2012 | Lee | |
| 2012/0210737 A1 | 8/2012 | Giardino | |
| 2012/0312034 A1 | 12/2012 | Oh | |
| 2013/0186111 A1 | 7/2013 | Kim | |
| 2013/0274937 A1 * | 10/2013 | Ahn | H02J 3/14 700/291 |
| 2013/0305751 A1 | 11/2013 | Gomes | |
| 2014/0007611 A1 | 1/2014 | Jeon | |
| 2014/0182318 A1 | 7/2014 | Eom | |
| 2014/0260378 A1 | 9/2014 | Gomes | |
| 2014/0316581 A1 | 10/2014 | Fadell | |
| 2015/0040307 A1 | 2/2015 | Deloche | |
| 2015/0121925 A1 | 5/2015 | Park | |
| 2015/0121928 A1 | 5/2015 | Lee | |
| 2015/0135750 A1 | 5/2015 | Ushijima | |
| 2015/0192346 A1 | 7/2015 | Lee | |
| 2015/0204592 A1 | 7/2015 | Iwasaki | |
| 2015/0330703 A1 | 11/2015 | Satou | |
| 2015/0362239 A1 | 12/2015 | Chen | |
| 2016/0061507 A1 | 3/2016 | Penn, II | |
| 2016/0153686 A1 | 6/2016 | Matsui | |
| 2017/0059228 A1 | 3/2017 | Hu | |
| 2017/0089625 A1 | 3/2017 | Wallace | |
| 2017/0141709 A1 | 5/2017 | Fukuda | |
| 2017/0152850 A1 | 6/2017 | Ryu | |
| 2017/0292742 A1 | 10/2017 | Douglas et al. | |

FOREIGN PATENT DOCUMENTS

| | | |
|---|---|---|
| CN | 102345951 | 2/2012 |
| CN | 103216983 | 7/2013 |
| KR | 10-2008-0022002 A | 3/2008 |
| KR | 10-2011-0087465 | 8/2011 |
| KR | 10-2011-0138811 A | 12/2011 |
| WO | WO 03/019090 A1 | 3/2003 |

OTHER PUBLICATIONS

Korean Office Action issued in Application No. 10-2015-0000696 dated Apr. 19, 2016.

European Search Report issued in Application No. 15194250.5 dated Jun. 1, 2016.

U.S. Office Action dated Jul. 14, 2017 issued in co-pending U.S. Appl. No. 14/794,461.

U.S. Appl. No. 14/794,461, filed Jul. 8, 2015.

Chinese Office Action issued in Application 201510654633.9 dated Sep. 22, 2017 (full Chinese text and full English translation).

United States Office Action dated Dec. 13, 2017 issued in co-pending U.S. Appl. No. 14/794,461.

* cited by examiner

REFRIGERATOR AND METHOD FOR CONTROLLING THE SAME

CROSS-REFERENCE TO RELATED APPLICATION

This application claims priority under 35 U.S.C. § 119 to Korean Patent Application No. 10-2015-0000696, filed in Korea on Jan. 5, 2015, whose entire disclosure is hereby incorporated by reference.

BACKGROUND

1. Field

A refrigerator and a method for controlling the same are disclosed herein.

2. Background

Generally, a refrigerator has a plurality of storage chambers for accommodating and keeping food frozen or refrigerated, and one surface of each storage chamber is opened to receive or take out the food. The plurality of storage chambers include a freezing chamber for keeping the food frozen and a refrigerating chamber for keeping the food refrigerated.

In the refrigerator, a refrigeration system in which a refrigerant is circulated is driven. The refrigeration system includes a compressor, a condenser, an expander and an evaporator. A refrigerant gas generated by the evaporator may be supplied to the freezing chamber or the refrigerating chamber.

The refrigerator is an always-operated product which is continuously operated when a power cord thereof is connected with a power source. Therefore, the refrigerator may be an electric appliance having a relatively large power consumption among various electric products. Recently, a technique which may estimate or measure a power amount consumed by the refrigerator has been proposed to efficiently perform a power management of the refrigerator.

The applicant has proposed the technique for estimating the power amount of an electric product which has been applied for a patent.

1. Application Number (Filing date): KR 2010-0058918 (Jun. 22, 2010)
2. Title of the disclosure: Network system In such an application, a power consumption of an energy-consuming unit included in an electric product may be just estimated using an information value stored in a memory, and there is a limitation in performing an operation which substantially reduces a power consumption, while monitoring an operation state of the electric product.

BRIEF DESCRIPTION OF THE DRAWINGS

The embodiments will be described in detail with reference to the following drawings in which like reference numerals refer to like elements wherein.

DETAILED DESCRIPTION

Hereinafter, exemplary embodiments of the present disclosure will be described in detail with reference to the accompanying drawings. However, the present disclosure is not limited to the exemplary embodiments disclosed below, and those skilled in the art appreciating the ideas of the present disclosure can easily propose other embodiments within the scope of the present disclosure.

Figure 1:
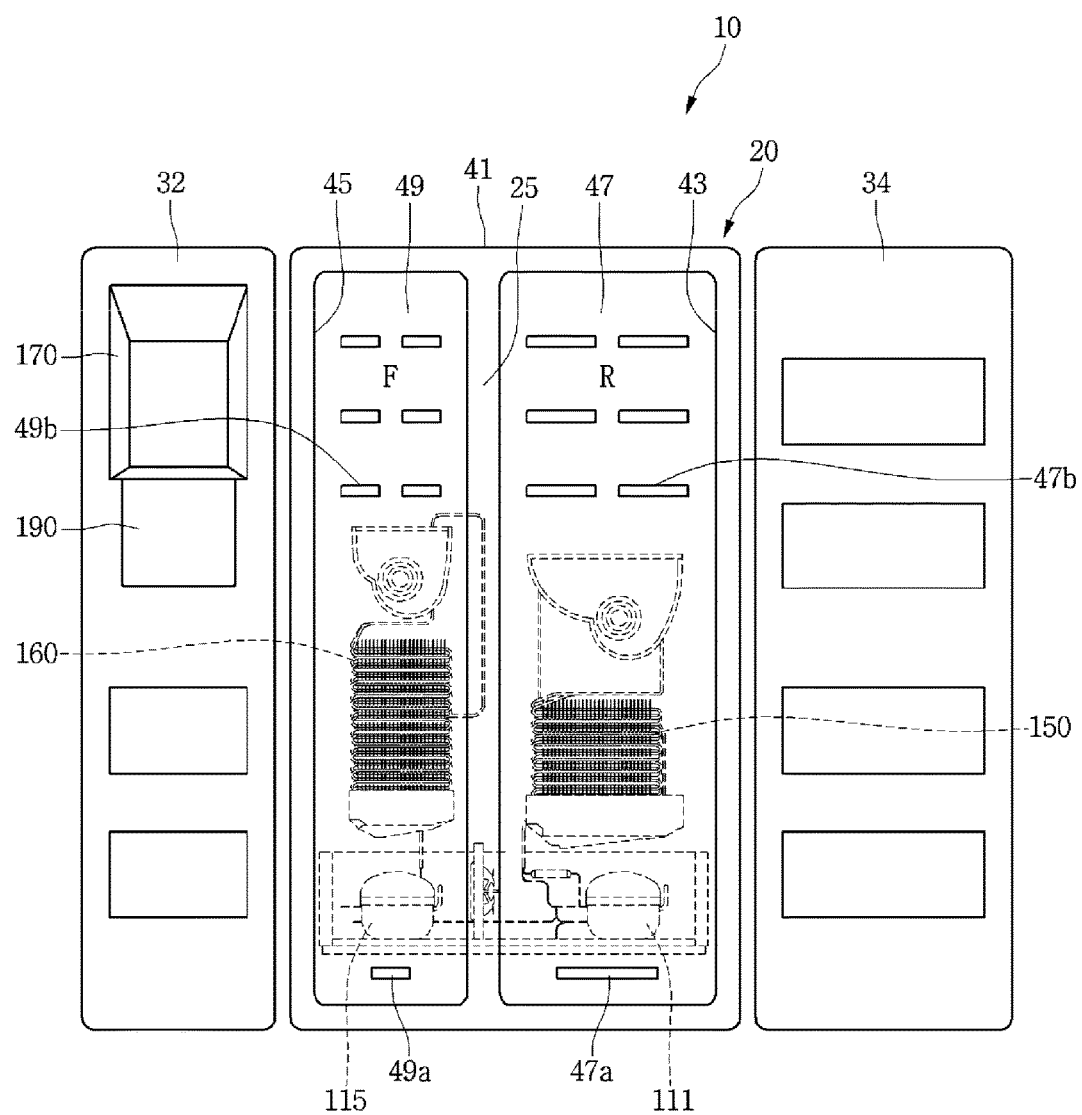
FIG. 1 is a front view illustrating a structure of a refrigerator according to an embodiment of the present disclosure.
Figure 2:
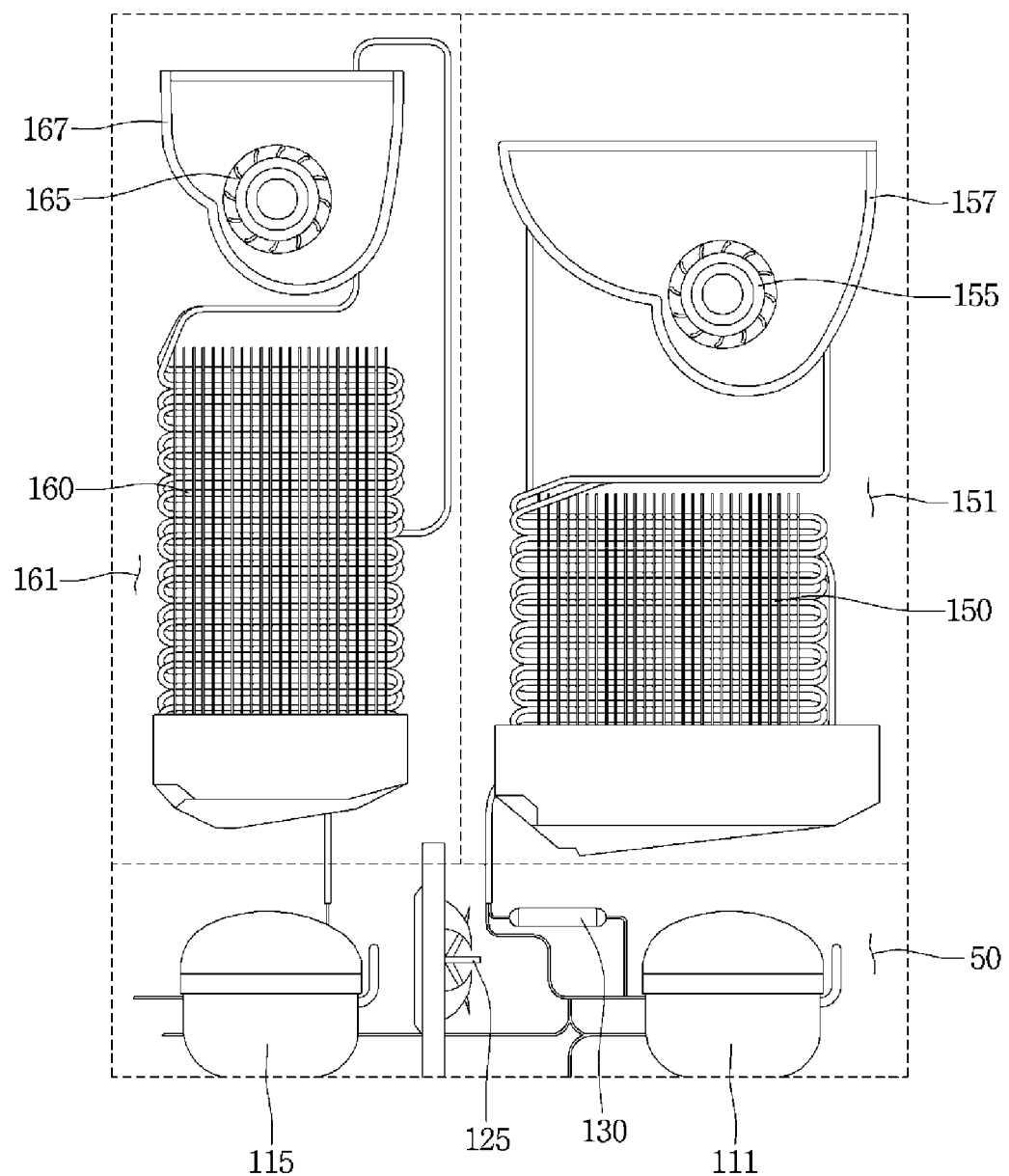
FIG. 2 is a view illustrating a part of the structure of the refrigerator according to an embodiment of the present disclosure, when seen from a front side of the refrigerator.

FIG. 1 is a front view illustrating a structure of a refrigerator according to an embodiment of the present disclosure, and FIG. 2 is a view illustrating a part of the structure of the refrigerator according to an embodiment of the present disclosure, when seen from a front side of the refrigerator.

Referring to FIGS. 1 and 2, a refrigerator 10 includes a main body 20 in which a freezing chamber F and a refrigerating chamber R are formed. The freezing chamber F and the refrigerating chamber R are independently formed in the main body 20, and may be divided by a partition 25. The drawing illustrates an example in which the freezing chamber F and the refrigerating chamber R are disposed at left and right sides to be spaced from each other. However, the freezing chamber F and the refrigerating chamber R may be disposed to be spaced up and down.

The main body 20 includes a freezing chamber door 32 which opens and closes the freezing chamber F, and a refrigerating chamber door 34 which opens and closes the refrigerating chamber R. An ice-making device 170 which makes and stores ice, and a dispenser 190 which dispenses water or ice made by the ice-making device 170 may be installed at the freezing chamber door 32. The ice-making device 170 may include an ice-making machine 172 (referring to FIG. 3) for making the ice.

The main body 20 includes an outer case 41 which forms an exterior of the refrigerator 10, a freezing chamber inner case 45 which is disposed at an inside of the outer case 41 and forms an inner surface of the freezing chamber F, and a refrigerating chamber inner case 43 which is disposed at the inside of the outer case 41 and forms an inner surface of the refrigerating chamber R.

The refrigerator 10 includes a plurality of evaporators 150 and 160 which separately cool the refrigerating chamber R and the freezing chamber F, respectively. The plurality of evaporators 150 and 160 includes a refrigerating chamber evaporator 150 for cooling the refrigerating chamber R and a freezing chamber evaporator 160 for cooling the freezing chamber F.

The main body 20 includes a freezing chamber rear panel 49 which divides an internal space of the freezing chamber inner case 45 into the freezing chamber F for keeping food frozen and a freezing heat exchanging chamber 161 for accommodating the freezing chamber evaporator 160. That is, it may be understood that the freezing chamber rear panel 49 is a storage chamber cover, i.e., a "freezing chamber cover" which isolates the freezing heat exchanging chamber 161 from the freezing chamber F.

A cool air inlet port 49a through which cool air of the freezing chamber F is introduced into the freezing heat exchanging chamber 161, and a cool air outlet port 49b through which cool air cooled by the freezing chamber evaporator 160 is discharged to the freezing chamber F may be formed at the freezing chamber rear panel 49. A freezing chamber fan 165 as an air blower by which air in the freezing chamber F is circulated into the freezing heat exchanging chamber 161 and the freezing chamber F may be disposed at the freezing heat exchanging chamber 161.

The main body 20 includes a refrigerating chamber rear panel 47 which divides an internal space of the refrigerating chamber inner case 43 into the refrigerating chamber R for keeping food refrigerated and a refrigerating heat exchanging chamber 151 for accommodating the refrigerating chamber evaporator 150. The refrigerating heat exchanging chamber 151 and the freezing heat exchanging chamber 161 may be commonly referred to as a "heat exchanging chamber".

That is, it may be understood that the refrigerating chamber rear panel 47 is a storage chamber cover, i.e., a "refrigerating chamber cover" which isolates the refrigerating heat exchanging chamber 151 from the refrigerating chamber R. The refrigerating chamber cover and the freezing chamber cover may be provided at both sides of the partition 25.

A cool air inlet port 47a through which cool air of the refrigerating chamber R is introduced into the refrigerating heat exchanging chamber 151, and a cool air outlet port 47b through which cool air cooled by the refrigerating chamber evaporator 150 is discharged to the refrigerating chamber R may be formed at the refrigerating chamber rear panel 47. A refrigerating chamber fan 155 as an air blower by which air in the refrigerating chamber R is circulated into the refrigerating heat exchanging chamber 151 and the refrigerating chamber R may be disposed at the refrigerating heat exchanging chamber 151.

The refrigerator 10 includes a plurality of compressors 111 and 115 which compresses a refrigerant, a condenser (not shown) which condenses the refrigerant compressed by the plurality of compressors 111 and 115, an expansion device (not shown) to decompress the refrigerant condensed the condenser and the plurality of evaporators 150 and 160 to evaporate the refrigerant passing through the expansion device.

The plurality of compressors 111 and 115 may include a first compressor 111 and a second compressor 115. It may be understood that the second compressor 115 is a "low pressure compressor" which is disposed at a low pressure side to primarily compress the refrigerant, and the first compressor 111 is a "high pressure compressor" which further compresses (secondarily compresses) the refrigerant compressed by the second compressor 115.

The refrigerant evaporated in the freezing chamber evaporator 160 may be introduced into the second compressor 115, and the refrigerant compressed by the second compressor 115 may be combined with the refrigerant evaporated in the refrigerating chamber evaporator 150, and then may be introduced into the first compressor 111.

The refrigerator 10 may further include a dryer 130 which is installed at an exit side of the condenser to remove moisture or impurities contained in the refrigerant condensed by the condenser. The dryer 130 is installed at an inlet side of the expansion device.

The refrigerating chamber fan 155 which is provided at one side of the refrigerating chamber evaporator 150 to circulate the cool air, and a first flow guide 157 which accommodates the refrigerating chamber fan 155 therein and guides the cool air passing through the refrigerating chamber fan 155 to the cool air outlet port 47b are installed at the refrigerating heat exchanging chamber 151.

The freezing chamber fan 165 which is provided at one side of the freezing chamber evaporator 160 to circulate the cool air, and a second flow guide 167 which accommodates the freezing chamber fan 165 therein and guides the cool air passing through the freezing chamber fan 165 to the cool air outlet port 49b are installed at the freezing heat exchanging chamber 161.

A machinery chamber 50 is formed at a lower portion of the main body 20. The machinery chamber 50 may be in communication with an indoor space in which the refrigerator 10 is installed, and may be maintained at room temperature. The first and second compressors 111 and 115, the condenser, a condenser fan 125, and the dryer 130 may be installed at the machinery chamber 50.

Figure 3:
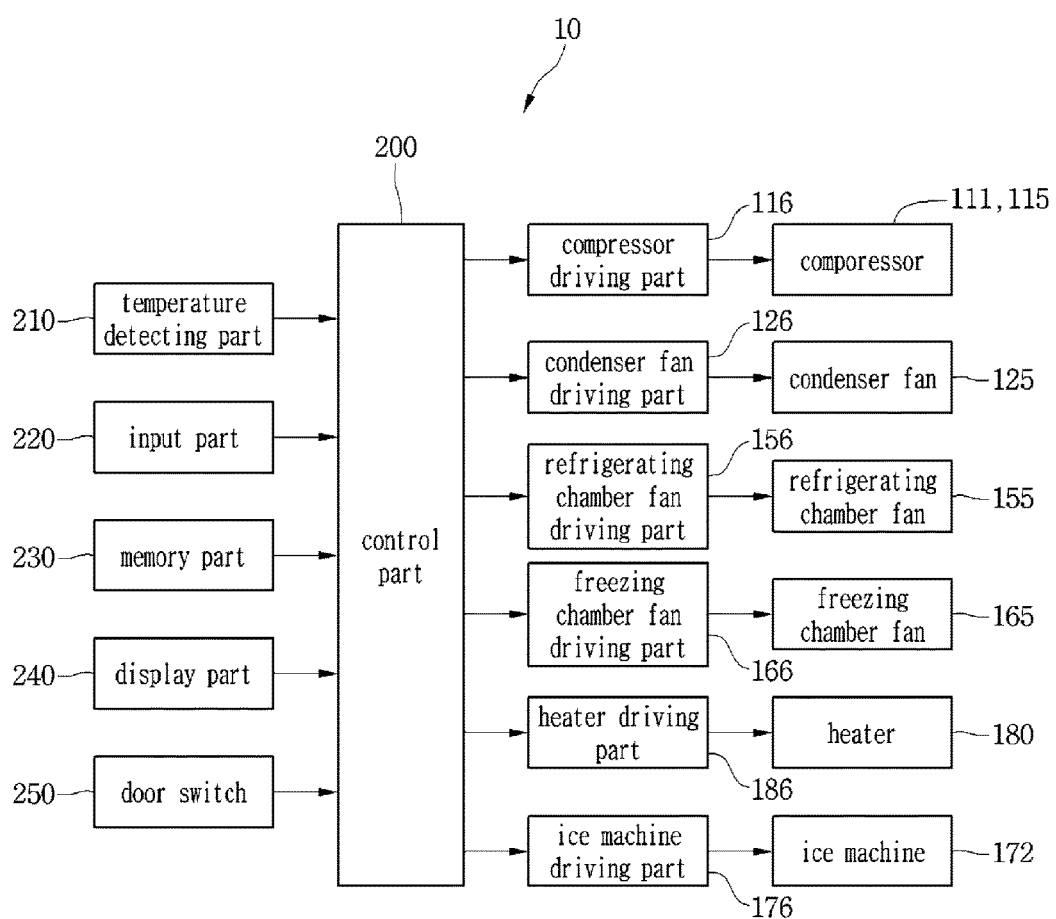
FIG. 3 is a block diagram illustrating the structure of the refrigerator according to an embodiment of the present disclosure.

FIG. 3 is a block diagram illustrating the structure of the refrigerator according to an embodiment of the present disclosure.

Referring to FIG. 3, the refrigerator 10 according to an embodiment of the present disclosure further includes a temperature detecting part 210 which detects a temperature in the refrigerating chamber R or the freezing chamber F and transfers a signal corresponding to the detected temperature to a control part 200.

The refrigerator 10 further includes an input part 220 which may input an operating condition for an operation of the refrigerator. The input part 220 may include another input part which may input setting temperature information of the refrigerating chamber or the freezing chamber.

The refrigerator 10 further includes a memory part 230 which stores data necessary to operate the refrigerator. As an example, the memory part 230 may store a power consumption which is measured during the operation of the refrigerator according to a predetermined period. The memory part 230 may store power consumption information for each of a plurality of power-consuming units which are provided at the refrigerator 10. For example, the plurality of power-consuming units may include the condenser fan 125, the refrigerating chamber fan 155, the freezing chamber fan 165, a heater 180, the ice-making machine 172, and so on.

According to whether each of the power-consuming units in the refrigerator is operated, the memory part 230 may output the corresponding power consumption information to the control part 200.

The refrigerator 10 further includes a display part 240 which displays information related to an operation state of the refrigerator. For example, the display part 240 may display setting temperature information of the refrigerating chamber or the freezing chamber, and information of a service type (cubed ice, water or pieced ice) of the dispenser 190.

The refrigerator 10 further includes a door switch 250 which is installed at each of the freezing chamber door 32 and the refrigerating chamber door 34 to detect whether the freezing chamber door 32 and the refrigerating chamber door 34 are opened.

The refrigerator may include a compressor driving part 116 which drives the first and second compressors 111 and 115, a condenser fan driving part 126 which drives the condenser fan 125, a refrigerating chamber fan driving part 156 which drives the refrigerating chamber fan 155, and a freezing chamber fan driving part 166 which drives the freezing chamber fan 165. The compressor driving part 116 may include a first compressor driving part which drives the first compressor 111, and a second compressor driving part which drives the second compressor 115.

And the refrigerator 10 further includes the control part 200 which controls driving of each of the driving parts 116, 126, 156 and 166. The control part 200 may output a corresponding speed instruction value to each of the driving parts 116, 126, 156 and 166.

The refrigerator 10 further includes a heater driving part 186 which drives the heater 180. For example, the heater 180 may include a defrosting heater which defrosts the refrigerating chamber evaporator 150 or the freezing chamber evaporator 160. The heater 180 may be installed adjacent to the refrigerating chamber evaporator 150 or the freezing chamber evaporator 160. The control part 200 may control the heater driving part 186, and may control an output of the heater 180.

The refrigerator 10 further includes the ice-making machine 172 which makes ice using supplied water and the cool air of the freezing chamber F, and an ice-making machine driving part 176 which controls an operation of the ice-making machine 172. For example, the ice-making machine driving part 176 may drive an ejector (not shown). It may be understood that the ejector is a tool which is provided at the ice-making machine 172 to take out the produced ice.

Meanwhile, the control part 200 may calculate the power consumption information of the compressor through electric power information of the first and second compressors 111 and 115. The control part 200 may calculate a final power consumption according to whether the plurality of power-consuming units are operated, using the previously stored power consumption information of each unit and the calculated power consumption information of the compressor.

Specifically, the compressor driving part 116 may have a compressor controller. The compressor controller may calculate a power consumption of the compressor based on an output current or an input current flowing through a compressor motor.

Since the power consumption value of each of the plurality of power-consuming units, i.e., the condenser fan 125, the refrigerating chamber fan 155, the freezing chamber fan 165, the heater 180, and the ice-making machine 172, when each of the units is operated, is previously set and stored in the memory part 230, the power consumption information may be calculated according to whether each of the units is operated.

In the memory part 230, the power consumption information of each of the condenser fan 125, the refrigerating chamber fan 155, and the freezing chamber fan 165 may be stored according to an RPM of each fan, and the power consumption information of the heater 180 may be stored according to an output power value.

Figure 4:
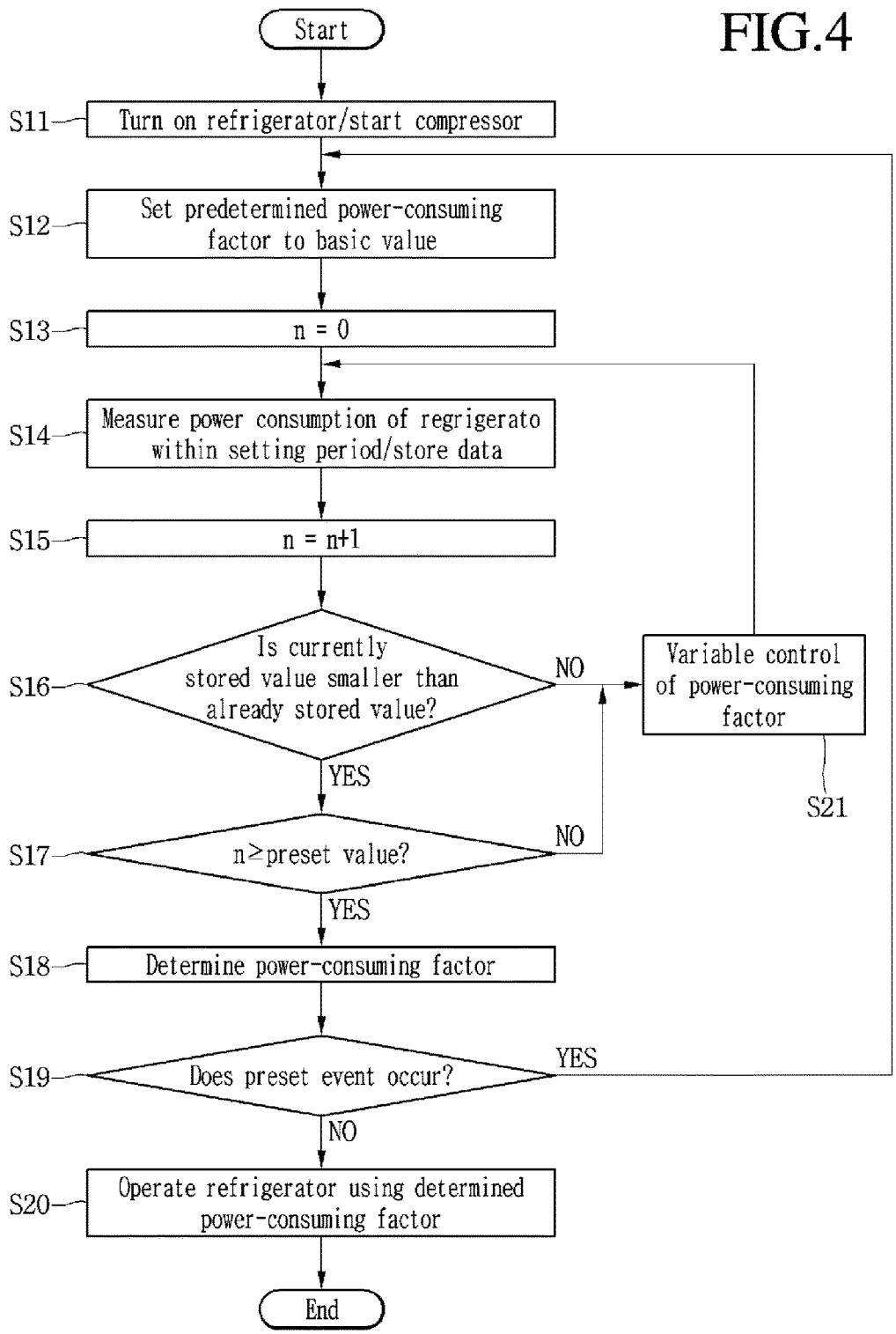
FIG. 4 is a flowchart illustrating a method of controlling the refrigerator according to an embodiment of the present disclosure.
Figure 5:
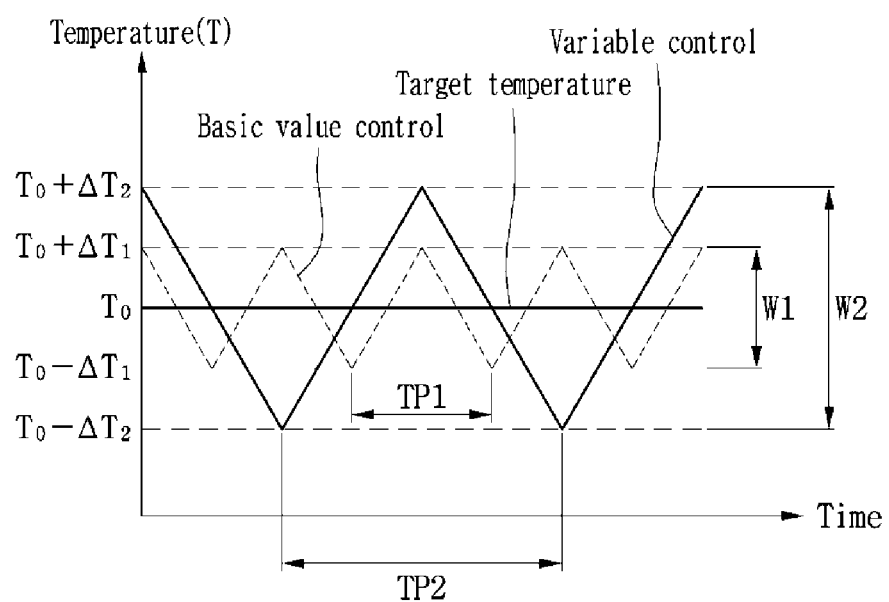
FIG. 5 is a graph illustrating a change in a temperature of a storage chamber over time, when one power-consuming factor is changed according to an embodiment.

FIG. 4 is a flowchart illustrating a method of controlling the refrigerator according to an embodiment of the present disclosure, and FIG. 5 is a graph illustrating a change in a temperature of a storage chamber over time, when one power-consuming factor is changed according to an embodiment.

Referring to FIG. 4, when the refrigerator 10 is turned on, and the compressors 111 and 115 are operated (S11), a predetermined power-consuming factor may be set to a basic value. The predetermined power-consuming factor may include a cooling capacity of the compressor having a relatively large power consumption among the plurality of power-consuming units, a voltage applied to each fan 125, 155, 165, and a size of a temperature control section of the storage chamber.

It may be understood that the cooling capacity of the compressor is an output value which is determined according to an operating frequency of each of the compressors 111 and 115. The cooling capacity of the compressor may be increased, as the operating frequency is increased, and may be reduced as the operating frequency is reduced.

The voltage applied to each fan 125, 155, 165 may include a voltage applied to the condenser fan 125, a voltage applied to the refrigerating chamber fan 155, and a voltage applied to the freezing chamber fan 165.

It may be understood that the temperature control section of the storage chamber is a temperature section which is set up or down by a setting value based on a target temperature of the storage chamber set by a user. For example, the first compressor 111 or the second compressor 115 may be controlled to be turned on at an upper limit value which is higher than the target temperature, and to be turned off at a lower limit value which is lower than the target temperature. When the temperature control section of the storage chamber is changed, an ON period of each of the first and second compressors 111 and 115 may be changed.

It may be understood that the basic value of the power-consuming factor is a factor value which is set in a state in which much cooling capacity of the refrigerator is required, for example, a state in which a defrosting operation is performed, a state in which the door of the refrigerator is opened, a state which a temperature of the storage chamber is set very low, and a state in which the space in which the refrigerator is installed has high humidity.

In summary, the basic value may be defined as a value in a state in which the setting value of the power-consuming factor is maximum. Therefore, when the power-consuming factor is set to the basic value, within a preset range, each of the compressors 111 and 115 is operated at the maximum operating frequency, and the voltage applied to each fan 125, 155, 165 is maximum, and the up and down size of the temperature control section of the storage chamber is set minimally, and thus the ON period of each of the compressors 111 and 115 may be set to have the shortest time interval (S12).

When the power-consuming factor is set to the basic value, it is recognized as n=0. While the refrigerator is operated, a power consumption of the refrigerator may be measured within a preset period, and the measured data may be stored.

Specifically, the power consumption of the refrigerator may be determined as an accumulation value of the power value for a predetermined period of time within the ON/OFF period of each of the compressors 111 and 115. That is, within a section from tuning-on of the compressors 111 and 115 till tuning-off thereof, the power consumption information of the compressors and the plurality of driven power-consuming units may be measured for the predetermined period of time. For example, the predetermined period of time may be one second.

Eventually, by measuring several times the power consumption for the predetermined period of time from the tuning-on of the compressors 111 and 115 till the tuning-off thereof, and calculating the accumulation value of the power consumption measured several times, an erroneous measurement of the power consumption due to unexpected unstable operations of the power-consuming units may be prevented, and thus the power consumption of the refrigerator may be relatively accurately measured.

The measured power consumption information of the refrigerator may be stored in the memory part 230 (S13 and S14). Meanwhile, operation S14 may be repeatedly performed. At this time, the power consumption information may be accumulatively stored in the memory part 230.

When the measuring of the power consumption and the storing of the data are completed, it is recognized as n=n+1 (S15). Whether currently stored power consumption information is smaller than power consumption information already stored in the memory part 230, i.e., whether there is a minimum value, when the power consumption measured at this time is compared with one or more power consumption values which were previously stored, may be recognized (S16).

When the currently stored power consumption information is smaller than the power consumption information already stored in the memory part 230, whether the n is equal to or more than a predetermined value may be recognized. When the n is equal to or more than the predetermined value, the power-consuming factor may be determined (S17 and S18).

On the other hand, when the currently stored power consumption information is compared with the power consumption already stored in the memory part 230, and it is not the minimum value, or the n is less than the predetermined value, the power-consuming factor may be controlled to be changed (variable control of the power consuming-factor).

The case in which the currently stored power consumption information is not the minimum value means that a currently set power-consuming factor is not a combination for minimum power consumption, and thus this will be excluded.

When the n is less than the predetermined value, the power consumption information as a comparison target is not sufficiently accumulated and stored, and this will be also excluded. In particular, when only the power consumption measured in a state in which the power-consuming factor is set to the basic value is stored, there is no previously stored data, and thus the predetermined value should be 2 or more.

The variable control of the power consuming-factor may include control of the power-consuming factor, i.e., control of the cooling capacity of the compressor, control of the voltage applied to each fan 125, 155, 165, and control of the temperature control section of the storage chamber.

In one example, the cooling capacity of the compressor may be controlled to be reduced by a preset value. The preset value may be 5%. When the cooling capacity of the compressor is reduced by the preset value, the ON period of the compressor may be increased corresponding to the reduced cooling capacity. Therefore, even though the cooling capacity of the compressor is reduced, the power consumption of the refrigerator is not necessarily reduced.

In another example, the voltage applied to the fan may be controlled to be reduced by a preset value. When the voltage applied to the fan is reduced, since an output value of the fan is reduced and the temperature of the storage chamber may not arrive at the setting temperature within a short time, the ON period of the compressor may be increased. Therefore, even though the voltage applied to the fan is reduced, the power consumption of the refrigerator is not necessarily reduced.

In still another example, the temperature control section of the storage chamber may be controlled to be increased.

Specifically, referring to FIG. 5, when the power-consuming factor is set and controlled to the basic value (control of basic value), an upper limit value for controlling the compressor is set to $T_o+\Delta T1$ based on a target temperature $T_o$ of the storage chamber, and a lower limit value is set to $T_o-\Delta T1$. Therefore, when the temperature of the storage chamber is more than the upper limit value, the compressor may be turned on, and when the temperature of the storage chamber is the lower limit value or less, the compressor may turned off. In such a method, the compressor is periodically turned on and off. At this time, the ON period of the compressor is TP1. And a temperature control width may be W1.

In this situation, when the variable control of the power-consuming factor is performed, the upper limit value may be increased to $T_o+\Delta T2$, and the lower limit value may be reduced to $T_o-\Delta T2$. The T2 may be greater than the T1. At this time, the ON period of the compressor is TP2, and the temperature control width may be W2. The W2 may be greater than the W1, and the TP2 may be greater than the TP1.

When the variable control is performed, and compared with the control of the basic value, the ON period of the compressor is relatively increased, and the number of ON/OFF switching times is relatively reduced.

Meanwhile, when the compressor is turned on in an OFF state, a current (which is an input value input to the compressor) is sharply increased, and then a state of the compressor is stabilized, and the current is reduced. That is, when the compressor is turned on, a current larger than a reference current (a reference value) flows, and thus the power consumption is increased.

Therefore, when the variable control is performed, even though the ON period of the compressor is increased, the power consumption of the refrigerator is not necessarily increased. This is because the number of ON times of the compressor is reduced.

A combination of the above-described various embodiments of the variable control, i.e., the control of the cooling capacity of the compressor, the control of the voltage of the fan, and the control of the temperature control section of the storage chamber, may be performed.

Alternatively, a setting value which reduces the cooling capacity of the compressor may be changed, and also a setting value which reduces the voltage applied to the fan may be changed. And when the variable control of the temperature control section of the storage chamber is performed, the upper and lower limit values may be set differently (S21).

After the variable control of the power-consuming factor is performed, it may be returned to operation S14, and then the power consumption is measured, and the measured data is accumulatively stored. And operations S15 to S17 may be repeatedly performed, and a combination of the power-consuming factors which draws the minimum power consumption may be traced.

When the power-consuming factor is determined in the S18 using such a control method, whether a preset event occurs may be recognized (S19). The preset event may include a defrosting operation of the evaporators 150 and 160, opening of the refrigerator door, and resupplying of electric power after power down of the refrigerator. When the preset event occurs, it is returned to operation S12, and then the above-described processes are performed again.

When the defrosting operation of the evaporator is performed, since the evaporator fan may be turned off, and a reverse cycle of a refrigeration system may be performed, or the heater 180 may be operated, a general operation of the refrigerator is restricted. At this time, another power-consuming factor having the minimum power consumption should be traced through a new tracing process, and thus the operations following operation S12 may be performed again.

Similarly, when the refrigerator door is opened, the temperature of the storage chamber is suddenly increased, and a load of the refrigerator is increased. Also, when electric power is resupplied to the refrigerator after the power down, the load of the refrigerator is increased. Therefore, the operations following operation S12 may be performed again.

If the preset event does not occur in operation S19, the operation of the refrigerator may be controlled using the power-consuming factor determined in operation S18 (S20).

According to the above-described control method, since the power consumption is measured using the ON period of the compressor of the refrigerator, and the power consumption is monitored while the variable control of the predetermined power-consuming factor is performed, the power-consuming factor having the minimum power consumption may be traced. Therefore, it is possible to improve the power consumption of the refrigerator, and to reduce an electric cost.

According to the embodiment, an optimal combination of the power-consuming factors can be drawn by measuring the power consumption which is consumed by the operation of the refrigerator, and determining whether the power consuming-factors are changed based on the measured power consumption. And the drawn combination of the power-consuming factors can be reflected on a next operation of the refrigerator, and thus the power consumption of the refrigerator can be reduced.

In particular, when the refrigerator is turned on and the compressor is driven, the power-consuming factor having a minimum power consumption can be automatically traced, as a size or an operating time of the power-consuming factor is changed in a process in which a maximum value of the power-consuming factor is set and the power-consuming factor is changed.

Also, when a new event related to the operation of the refrigerator, e.g., a defrosting operation or opening of the refrigerator occurs, the above-described control method is performed again, and thus an optimal operating condition according to an operation state of the refrigerator can be drawn.

Even though all the elements of the embodiments are coupled into one or operated in the combined state, the present disclosure is not limited to such an embodiment. That is, all the elements may be selectively combined with each other without departing the scope of the disclosure. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms including technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the scope of the disclosure as defined by the appended claims. Therefore, the preferred embodiments should be considered in descriptive sense only and not for purposes of limitation, and also the technical scope of the disclosure is not limited to the embodiments. Furthermore, the present disclosure is defined not by the detailed description of the disclosure but by the appended claims, and all differences within the scope will be construed as being included in the present disclosure.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The present disclosure is directed to a refrigerator capable of reducing a power consumption, and a method for controlling the same.

According to an aspect of the present disclosure, there is provided a method for controlling a refrigerator including turning on the refrigerator, and starting a compressor; setting a predetermined power-consuming factor to a basic value; measuring a power consumption within a setting period, while the refrigerator is operated; recognizing whether the measured power consumption is smaller than a previous power consumption; and changing a value of the power-consuming factor, when the measured power consumption is greater than the previous power consumption.

When the measured power consumption is smaller than the previous power consumption, the value of the power-consuming factor may be determined.

The method may further include storing the measured power consumption in a memory part, and the previous power consumption may include information related to one or more power consumptions accumulatively stored in the memory part.

The predetermined power-consuming factor may include a cooling capacity of the compressor, a voltage applied to a fan, and a temperature control section of a storage chamber.

The changing of the value of the power-consuming factor may include reducing the cooling capacity of the compressor by a preset value.

The changing of the value of the power-consuming factor may include reducing the voltage applied to the fan by a preset value.

The changing of the value of the power-consuming factor may include increasing an up and down width of the temperature control section of the storage chamber.

The method may further include recognizing whether a preset event occurs, and setting the predetermined power-consuming factor to the basic value again, when the preset event occurs.

The preset event may include a defrosting operation of the refrigerator, opening of a refrigerator door, or resupplying of electric power after power down of the refrigerator.

The basic value of the power-consuming factor may be a value in a state in which a setting value of the power-consuming factor is maximum.

The setting period may include an ON period of the compressor.

The measuring of the power consumption may include calculating a final power consumption using power consumption information of the compressor and already stored power consumption information of a plurality of power-consuming units.

The plurality of power-consuming units may include a refrigerator fan, a heater, and an ice-making machine.

According to another aspect of the present disclosure, there is provided a refrigerator including a compressor configured to compress a refrigerant; a condenser configured to condense the refrigerant compressed in the compressor; an evaporator in which the refrigerant condensed in the condenser is depressurized and introduced; a fan which is provided at one side of the condenser or the evaporator; a memory part configured to store power consumption information consumed according to an operation of the compressor and the fan; and a control part configured to control the operation of the compressor and the fan, wherein the control part sets a predetermined power-consuming factor to a basic value, determines a power consumption consumed by the compressor and the fan during a setting period of time, and changes the predetermined power-consuming factor, when it is recognized that the determined power consumption is greater than power consumption information already stored in the memory part.

The control part may determine the set power-consuming factor, when it is recognized that the determined power consumption is smaller than the power consumption information already stored in the memory part.

The details of one or more embodiments are set forth in the accompanying drawings and the description below. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator including a storage compartment, comprising:
    a plurality of power-consuming units including a compressor and other units including a fan;
    a memory configured to store power consumption which is measured during an operation of the plurality of power-consuming units according to a predetermined period; and
    a controller configured to control the operation of the plurality of power-consuming units,
    wherein:
        the memory outputs a corresponding power consumption to the controller according to whether each of the power-consuming units is operated,
        the controller sets power-consuming factors to a basic value, the power-consuming factors including a cooling capacity of the compressor, a voltage applied to the fan, and a temperature control interval of the storage compartment,
        the controller firstly determines power consumption of the compressor, and secondly determines a final power consumption using stored power consumption of each of the other units in the memory and the determined power consumption of the compressor when the compressor and at least one of the other units are operated,
        the determination of the final power consumption by the controller is repeatedly performed at least two times, and the repeatedly determined final power consumption is accumulatively stored in the memory,
            the controller confirms the power-consuming factors combined to form the final power consumption when the determined power consumption is less than a previous power consumption stored in the memory, and
        the controller changes the power-consuming factors to another power-consuming factors when the determined final power consumption is greater than the previous power consumption.

2. The refrigerator according to claim 1, wherein the previous power consumption includes information related to the plurality of power-consuming units.

3. The refrigerator according to claim 1, wherein the controller changes the power-consuming factors by reducing the cooling capacity of the compressor by a preset value.

4. The refrigerator according to claim 1, wherein the controller changes the power-consuming factors by reducing the voltage applied to the fan by a preset value.

5. The refrigerator according to claim 1, wherein the controller changes the power-consuming factors by increasing a width of the temperature control interval of the storage chamber.

6. The refrigerator according to claim 1, wherein in response to recognizing that a preset event occurs, the controller resets the power-consuming factors to the basic value.

7. The refrigerator according to claim 6, wherein the preset event is at least one of a defrosting operation of the refrigerator, an opening of a refrigerator door, and resupplying of electric power to the refrigerator after power down of the refrigerator.

8. The refrigerator according to claim 1, wherein the basic value of the power-consuming factors is a maximum value of each of the power-consuming factors.

9. The refrigerator according to claim 1, wherein the predetermined period is a time period when the compressor is on.

10. The refrigerator according to claim 1, wherein:
    the fan includes at least one of a condenser fan, a refrigerating fan and a freezing chamber fan, and
    the other units further include a heater and an ice-making machine.

* * * * *